US012563022B2

(12) United States Patent
Adolphe

(10) Patent No.: US 12,563,022 B2
(45) **Date of Patent: *Feb. 24, 2026**

(54) ENCRYPTION RETRANSMISSION INDUSTRIAL INTERNET OF THINGS (IIOT) DEVICE FOR PROVIDING RESILIENCY AGAINST ATTACKS

(71) Applicant: Forward Edge-AI, Inc., San Antonio, TX (US)

(72) Inventor: Eric Adolphe, San Antonio, TX (US)

(73) Assignee: Forward Edge-AI, Inc., San Antonio, TX (US)

( * ) Notice: Subject to any disclaimer, the term of this patent is extended or adjusted under 35 U.S.C. 154(b) by 295 days.

This patent is subject to a terminal disclaimer.

(21) Appl. No.: 18/354,387

(22) Filed: Jul. 18, 2023

(65) Prior Publication Data

US 2024/0364671 A1      Oct. 31, 2024

Related U.S. Application Data

(63) Continuation-in-part of application No. 18/345,080, filed on Jun. 30, 2023, and a continuation-in-part of
(Continued)

(51) Int. Cl.
*H04L 9/40*            (2022.01)
(52) U.S. Cl.
CPC ...... *H04L 63/0485* (2013.01); *H04L 63/0428* (2013.01); *H04L 63/1441* (2013.01)
(58) Field of Classification Search
CPC . H04L 63/0485; H04L 63/1441; H04L 9/002; H04L 63/0428; H04L 63/1416
See application file for complete search history.

(56) References Cited

U.S. PATENT DOCUMENTS

| | | | |
|---|---|---|---|
| 6,253,321 B1 | 6/2001 | Nikander et al. | |
| 6,393,456 B1 | 5/2002 | Ambler et al. | |
| (Continued) | | | |

FOREIGN PATENT DOCUMENTS

| | | |
|---|---|---|
| CN | 203840359 U | 9/2014 |
| CN | 11315817 A | 7/2021 |
| WO | 2017058183 A1 | 4/2017 |

OTHER PUBLICATIONS

"Simple encryption procedure for Internet of things (IoT) environments", Telecommunication Standardization Sector of ITU X.1362, obtained online from <https://www.itu.int/rec/dologin_pub.asp?lang=e&id=T-REC-X.1362-201703-I !!PDF-E&type=items>, retrieved on Jul. 26, 2025 (Year: 2017).*

(Continued)

*Primary Examiner* — Zhimei Zhu
(74) *Attorney, Agent, or Firm* — HUNTON ANDREWS KURTH LLP

(57)        ABSTRACT

An encryption retransmission Industrial Internet of Things (IIoT) device for providing resiliency against attacks comprises a sensor for generating sensor data, a processing unit for analyzing the sensor data to generate analytics data, a network switch comprising ports, and encryption retransmission devices connected to the network switch through the ports. The network switch identifies a first external device and a first encryption retransmission device and transfers the analytics data to a first encryption retransmission device comprising a first encryption unit for encrypting an egressing native packet comprising the analytics data to create an encrypted egressing native packet, adding a connectionless header to the encrypted egressing native packet to form an egressing connectionless datagram and a first communication unit for receiving the egressing connectionless datagram and adding a complex header to the egressing connectionless (Continued)

datagram for forming an egressing packet for delivery to a first external encryption retransmission device.

18 Claims, 14 Drawing Sheets

Related U.S. Application Data application No. 18/326,633, filed on May 31, 2023, and a continuation-in-part of application No. 18/309,289, filed on Apr. 28, 2023, and a continuation-in-part of application No. 18/309,323, filed on Apr. 28, 2023, now Pat. No. 12,255,995.

(56) References Cited

U.S. PATENT DOCUMENTS

| | | | |
|---|---|---|---|
| 11,188,046 B1 * | 11/2021 | ElHattab | G08B 13/19665 |
| 11,588,789 B2 | 2/2023 | Kerseboom et al. | |
| 11,588,798 B1 * | 2/2023 | Cline | H04L 63/0272 |
| 12,088,569 B1 * | 9/2024 | Cline | H04L 45/74 |
| 12,199,958 B1 * | 1/2025 | Layton | H04L 63/0428 |
| 2012/0201383 A1 | 8/2012 | Matsuo | |
| 2015/0009991 A1 | 1/2015 | Sung et al. | |
| 2018/0159765 A1 | 6/2018 | Shi et al. | |
| 2018/0183832 A1 * | 6/2018 | Chang | H04W 4/70 |
| 2019/0166152 A1 | 5/2019 | Steele et al. | |
| 2021/0364645 A1 * | 11/2021 | Kim | G06N 3/08 |
| 2022/0272122 A1 | 8/2022 | Kaabouch et al. | |
| 2022/0385567 A1 | 12/2022 | Zhang et al. | |
| 2023/0095149 A1 * | 3/2023 | Nawaz | H04L 63/0281 |
| | | | 713/153 |
| 2023/0138458 A1 | 5/2023 | Wei et al. | |

OTHER PUBLICATIONS

C. Hennebert and J.D. Santos, "Security Protocols and Privacy Issues into 6LoWPAN Stack: A Snthesis," in IEEE Internet of Things Journal, vol. 1, No. 5, pp. 384-398, Oct. 2014.

Gnanavel, S., Narayana, K. E., Jayashree, K., Nancy P., Teressa, Dawit Mamiru, Implementation of Block-Level Double Encryption Based on Machine Learning Techniques for Attack Detection and Prevention, Wireless Communications and Mobile Computing, 2022, 4255220 9 pages, Year: 2022.

M. Mushtaq et al., "Whisper: A Tool for Run-Time Detection of Side-Channel Attacks," in IEEE Access, vol. 88, pp. 83871-83900, Year: 2020.

Naeem Firdous Syed, Zubair Baig, Ahmed Ibrahim & Crag Valli (2020), Denial of Service Attack Detection Through Machine Learning for the IIT, Journal of Information and Telecommunication, 4:4, pp. 482-503, Year: 2020.

"Simple Encryption Procedure for Internet of Things (IoT) Environments," Telecommunication Standardized Sector of ITU X, 1362, obtained online from ,https://www.itu.int/rec/dologin_pub.asp?lang=e&id=T-REC-X.1362-201703-1 !!!PDF-E&type=items>, retrieved on Jul. 26, 2025, Year: 2017.

Thakkar, A., Lohiya, R. A Review on Machine Learning and Deep Learning Perspectives of IDS for IoT:Recent Updates, Security Issues, and Challenges. Arch Computat Methods Eng 28, 3211-3243, Year: 2021.

* cited by examiner

1300

1312

- AT LEAST ONE
  INFORMATION
- AT LEAST ONE FIRST
  INFORMATION 1320    1306

1302    1304

1400

1304    1322    1310

1304    1304

1304

1318    1326    1324    1314

DEVICE    1316

ENCRYPTION RETRANSMISSION INDUSTRIAL INTERNET OF THINGS (IIOT) DEVICE FOR PROVIDING RESILIENCY AGAINST ATTACKS

The current application is a continuation-in-part (CIP) application of the U.S. non-provisional application Ser. No. 18/309,289 filed on Apr. 28, 2023.

The current application is also a CIP application of the U.S. non-provisional application Ser. No. 18/309,323 filed on Apr. 28, 2023.

The current application is also a CIP application of the U.S. non-provisional application Ser. No. 18/326,633 filed on May 31, 2023.

The current application is also a CIP application of the U.S. non-provisional application Ser. No. 18/345,080 filed on Jun. 30, 2023.

FIELD OF THE INVENTION

Generally, the present disclosure relates to the field of data processing. More specifically, the present disclosure relates to an encryption retransmission Industrial Internet of Things (IIoT) device for providing resiliency against attacks.

BACKGROUND OF THE INVENTION

The field of data processing is technologically important to several industries, business organizations, and/or individuals. In particular, the use of data processing is prevalent for providing resiliency against attacks.

Existing techniques for facilitating communications between devices are deficient with regard to several aspects. For instance, current technologies are designed to facilitate communication between devices. As a result, different technologies are needed that make a device intelligent to monitor, collect, exchange, and analyze data and also establish attack-resilient communications with other devices.

Therefore, there is a need for an encryption retransmission Industrial Internet of Things (IIoT) device for providing resiliency against attacks that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an encryption retransmission Industrial Internet of Things (IIoT) device for providing resiliency against attacks, in accordance with some embodiments. Accordingly, the encryption retransmission IIOT device may include at least one sensor, a processing unit, a network switch, and a plurality of encryption retransmission devices. Further, the at least one sensor may be configured for generating at least one sensor data by detecting at least one variable associated with the encryption retransmission IIOT device. Further, the processing unit may be communicatively coupled with the at least one sensor. Further, the processing unit may be configured for analyzing the at least one sensor data for generating at least one analytics data for the at least one sensor data. Further, the network switch may be communicatively coupled with the processing unit. Further, the master switch may include a plurality of ports.

Further, the plurality of encryption retransmission devices may be connected with the network switch through the plurality of ports. Further, each of the plurality of encryption retransmission devices associated with each of the plurality of ports may include at least one encryption unit and a communication unit communicatively coupled with the at least one encryption unit. Further, the network switch may be configured for identifying a first external device from a plurality of external devices based on at least one information. Further, the plurality of external devices may be connected with a plurality of communication units of the plurality of encryption retransmission devices via a plurality of external encryption retransmission devices. Further, the network switch may be configured for identifying a first encryption retransmission device from the plurality of encryption retransmission devices based on the identifying of the first external device. Further, the network switch may be configured for transferring the at least one analytics data to the first encryption retransmission device based on the identifying of the first encryption retransmission device. Further, the first encryption retransmission device may include at least one first encryption unit and a first communication unit. Further, the at least one first encryption unit may be configured for encrypting an egressing native packet comprising the at least one analytics data using at least one encryption key to create an encrypted egressing native packet based on the transferring of the at least one analytics data. Further, the at least one first encryption unit may be configured for adding a connectionless header to the encrypted egressing native packet to form an egressing connectionless datagram. Further, the first communication unit may be communicatively coupled with the at least one first encryption unit. Further, the first communication unit may be paired with a first external communication unit of the first external encryption retransmission device connected to the first external device. Further, the first communication unit may be configured for receiving the egressing connectionless datagram. Further, the first communication unit may be configured for adding a complex header to the egressing connectionless datagram for forming an egressing packet for delivery to the first external encryption retransmission device.

Further disclosed herein is an encryption retransmission Industrial Internet of Things (IIoT) device for providing resiliency against attacks, in accordance with some embodiments. Accordingly, the encryption retransmission IIOT device may include at least one sensor, a processing unit, a storage device, a secondary processing unit, a network switch, and a plurality of encryption retransmission devices. Further, the at least one sensor may be configured for generating at least one sensor data by detecting at least one variable associated with the encryption retransmission IIOT device. Further, the processing unit may be communicatively coupled with the at least one sensor. Further, the processing unit may be configured for analyzing the at least one sensor data for generating at least one analytics data for the at least one sensor data. Further, the storage device may be communicatively coupled with the processing unit. Further, the storage device may be configured for storing the at least one sensor data. Further, the secondary processing unit may be communicatively coupled with the processing unit. Further, the secondary processing unit may be configured for performing at least one administrative task associated with at least one of the processing unit and the at least one sensor. Further, the generating of the at least one sensor data and the analyzing of the at least one sensor data may be based on the performing of the at least one administrative task. Further, the network switch may be communicatively coupled with the processing unit. Further, the master switch may include a plurality of ports. Further, the plurality of encryption retransmission devices may be connected with the network switch through the plurality of ports. Further, each of the plurality of encryption retransmission devices associated with each of the plurality of ports may include at least one encryption unit and a communication unit communicatively coupled with the at least one encryption unit. Further, the network switch may be configured for identifying a first external device from a plurality of external devices based on at least one information. Further, the plurality of external devices may be connected with a plurality of communication units of the plurality of encryption retransmission devices via a plurality of external encryption retransmission devices. Further, the network switch may be configured for identifying a first encryption retransmission device from the plurality of encryption retransmission devices based on the identifying of the first external device. Further, the network switch may be configured for transferring the at least one analytics data to the first encryption retransmission device based on the identifying of the first encryption retransmission device. Further, the first encryption retransmission device may include at least one first encryption unit and a first communication unit. Further, the at least one first encryption unit may be configured for encrypting an egressing native packet comprising the at least one analytics data using at least one encryption key to create an encrypted egressing native packet based on the transferring of the at least one analytics data. Further, the at least one first encryption unit may be configured for adding a connectionless header to the encrypted egressing native packet to form an egressing connectionless datagram. Further, the first communication unit may be communicatively coupled with the at least one first encryption unit. Further, the first communication unit may be paired with a first external communication unit of the first external encryption retransmission device connected to the first external device. Further, the first communication unit may be configured for receiving the egressing connectionless datagram. Further, the first communication unit may be configured for adding a complex header to the egressing connectionless datagram for forming an egressing packet for delivery to the first external encryption retransmission device.

Further disclosed herein is an encryption retransmission Industrial Internet of Things (IIoT) device for providing resiliency against attacks, in accordance with some embodiments. Accordingly, the encryption retransmission IIOT device may include at least one sensor, at least one actuator, a processing unit, a storage device, a secondary processing unit, a network switch, and a plurality of encryption retransmission devices. Further, the at least one sensor may be configured for generating at least one sensor data by detecting at least one variable associated with the encryption retransmission IIOT device. Further, the at least one actuator may be configured for performing at least one operation associated with the encryption retransmission IIOT device based on at least one operation data. Further, the processing unit may be communicatively coupled with the at least one sensor and the at least one actuator. Further, the processing unit may be configured for analyzing the at least one sensor data for generating at least one analytics data for the at least one sensor data. Further, the processing unit may be configured for generating the at least one operation data. Further, the storage device may be communicatively coupled with the processing unit. Further, the storage device may be configured for storing the at least one sensor data. Further, the secondary processing unit may be communicatively coupled with the processing unit. Further, the secondary processing unit may be configured for performing at least one administrative task associated with at least one of the processing unit and the at least one sensor. Further, the generating of the at least one sensor data and the analyzing of the at least one sensor data may be based on the performing of the at least one administrative task. Further, the network switch may be communicatively coupled with the processing unit. Further, the master switch may include a plurality of ports. Further, the plurality of encryption retransmission devices may be connected with the network switch through the plurality of ports. Further, each of the plurality of encryption retransmission devices associated with each of the plurality of ports may include at least one encryption unit and a communication unit communicatively coupled with the at least one encryption unit. Further, the network switch may be configured for identifying a first external device from a plurality of external devices based on at least one information. Further, the plurality of external devices may be connected with a plurality of communication units of the plurality of encryption retransmission devices via a plurality of external encryption retransmission devices. Further, the network switch may be configured for identifying a first encryption retransmission device from the plurality of encryption retransmission devices based on the identifying of the first external device. Further, the network switch may be configured for transferring the at least one analytics data to the first encryption retransmission device based on the identifying of the first encryption retransmission device. Further, the first encryption retransmission device may include at least one first encryption unit and a first communication unit. Further, the at least one first encryption unit may be configured for encrypting an egressing native packet comprising the at least one analytics data using at least one encryption key to create an encrypted egressing native packet based on the transferring of the at least one analytics data. Further, the at least one first encryption unit may be configured for adding a connectionless header to the encrypted egressing native packet to form an egressing connectionless datagram. Further, the first communication unit may be communicatively coupled with the at least one first encryption unit. Further, the first communication unit may be paired with a first external communication unit of the first external encryption retransmission device connected to the first external device. Further, the first communication unit may be configured for receiving the egressing connectionless datagram. Further, the first communication unit may be configured for adding a complex header to the egressing connectionless datagram for forming an egressing packet for delivery to the first external encryption retransmission device. Further, the first communication unit may be configured for receiving an ingressing packet comprising an encrypted ingressing native packet and a complex header from the first external encryption retransmission device. Further, the first communication unit may be configured for removing the complex header from the ingressing packet. Further, the first communication unit may be configured for adding a connectionless header to the ingressing packet for forming an ingressing connectionless datagram. Further, the ingressing connectionless datagram may include the encrypted ingressing native packet. Further, the at least one first encryption unit may be configured for receiving the ingressing connectionless datagram comprising the ingressing encrypted native packet. Further, the at least one first encryption unit may be configured for decrypting the encrypted ingressing native packet using the at least one encryption key to obtain an ingressing native packet. Further, the ingressing native packet may include at least one first information. Further, the network switch may be further configured for transferring the at least one first information to the processing unit based on the obtaining of the ingressing native packet. Further, the processing unit may be configured for analyzing the at least one first information based on the transferring of the at least one first information. Further, the generating of the at least one operation data may be further based on the analyzing of the at one first information.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
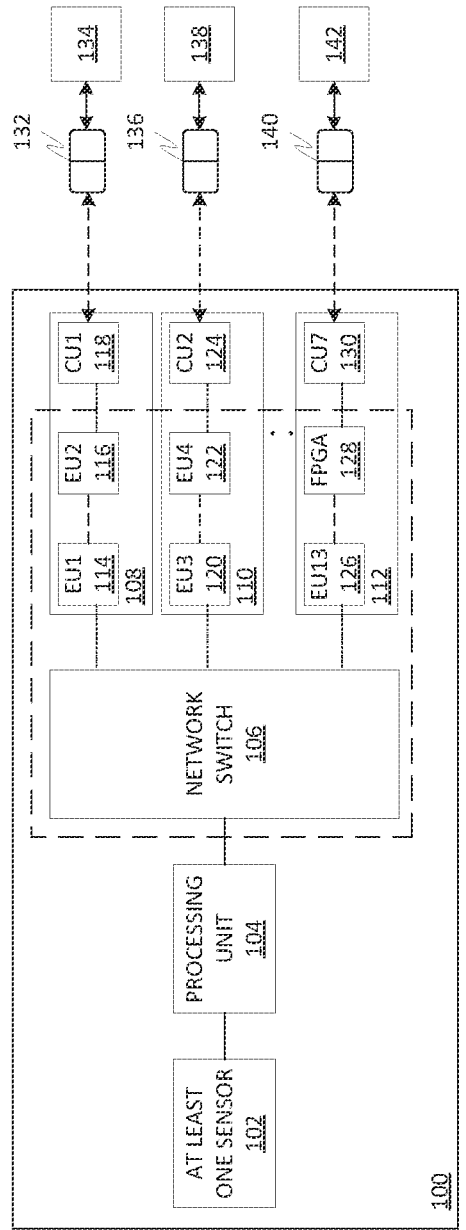
FIG. 1 is a block diagram of an encryption retransmission Industrial Internet of Things (IIoT) device 100 for providing resiliency against attacks, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an encryption retransmission Industrial Internet of Things (IIoT) device for providing resiliency against attacks, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based inter-face, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Overview

The present disclosure describes an encryption retransmission Industrial Internet of Things (IIoT) device for providing resiliency against attacks.

Further, the encryption retransmission Industrial Internet of Things (IIoT) device may implement a protocol free encryption device (PFED) (U.S. patent application Ser. No. 17/200,468, entitled "PROTOCOL FREE ENCRYPTING DEVICE," filed Mar. 12, 2021; incorporated herein by reference). Further, the encryption retransmission Industrial Internet of Things (IIoT) device may be Industrial Internet of things (IIoT) and Operational Technologies (OT) that is resistant to quantum attacks. Further, the encryption retransmission Industrial Internet of Things (IIoT) device may include sensors (e.g., temperature, humidity, water level, and barometric pressure), actuators), flash memory to store data collected from the sensors, a processor in SoC1 with algorithms for analytics, and a second processor in SoC2 to offload administrative tasks like power management. Further, the sensors, memory, SoC1, and SoC2 are all on the encrypted side of the encryption retransmission Industrial Internet of Things (IIoT) device which is left of the trust boundary of the encryption retransmission Industrial Internet of Things (IIoT) device. Further, the sensors, actuators, memory, SoC1, and SoC2 are not accessible from the unencrypted side of the encryption retransmission Industrial Internet of Things (IIoT) device which is right of the trust boundary of the encryption retransmission Industrial Internet of Things (IIoT) device. Further, there is no cryptographic bypass for the sensors, actuators, memory, SoC1, and SoC2 are not accessible from the unencrypted side. Further, the sensors, memory, SoC1, and SoC2 are the components of the encryption retransmission Industrial Internet of Things (IIoT) device and reside within the encryption retransmission Industrial Internet of Things (IIoT) device.

Further, the encryption retransmission Industrial Internet of Things (IIoT) device may include a six-port switch, with one management port. Further, the disclosed device is scalable and allows communications between more than two cryptographically bound devices. Further, the management port of the switch is always reserved as a management port (control port). The management port is able to send commands to the switch. Further, the seven-port switch contained inside the encryption retransmission Industrial Internet of Things (IIoT) device cannot be exposed to the outside world. The only access to the switch must come through first CU (communication unit), then EU (encryption unit), and then other encryption units (EU). Further, there are no cryptographic bypasses for the switch.

Further, the encryption retransmission Industrial Internet of Things (IIoT) device may include encryption retransmission devices which are protocol free encryption devices includes galvanic isolation to isolate data and power pins between encryption units and the communication units of the encryption retransmission device to protect against attacks such as PowerHammer. Further, the encryption retransmission device may include a network interface module (NIM) that on-boards all communication interfaces onto a PCB (printed circuit board) comprising the encryption units and communication units, connecting through the communication units to maintain a protocol break (see, U.S. patent application Ser. No. 17/200,468, entitled "PROTOCOL FREE ENCRYPTING DEVICE," filed Mar. 12, 2021; incorporated herein by reference), thus allowing for wireless communications. Further, the encryption units and the communication units are computing devices. Further, the PCB is encased in resin to prevent tampering and protect against BitWhisper (heat emission) attacks.

Further, the encryption retransmission Industrial Internet of Things (IIoT) device may also include an Anomaly Detector (AD) (or anti-tamper) that uses three different algorithms acting independently to detect anomalies that may signal an attack. The algorithms of the AD use multi-variant signal analysis. Further, the AD is capable of warning an operator and executing an "immune system" type of response. Further, the encryption retransmission Industrial Internet of Things (IoT) device may also include an inner case (Faraday Cage) to limit the leaking of radio signals from the encryption retransmission device, and further prevent access by an attacker. Further, the encryption retransmission Industrial Internet of Things (IIoT) device may also include a custom resin/plastic outer case to allow integration into multiple use cases. Further, the encryption retransmission Industrial Internet of Things (IIoT) device also provides a Four-hour backup battery operation. Further, the inner cage of the encryption retransmission Industrial Internet of Things (IIoT) device may be Extruded Aluminum Inner Case that houses the PCB and acts as a Faraday cage. Further, the anomaly detector may include a Raspberry Pi4 loaded with a software application. Further, a case of the anomaly detector is designed to be interlocked with the outer case of the encryption retransmission Industrial Internet of Things (IIoT) device. Further, the encryption retransmission Industrial Internet of Things (IIoT) device may be an Isidore Quantum Industrial Internet of Things (IIoT) device. Further, the Isidore Quantum Industrial Internet of Things (IoT) device includes an embedded software application. Further, the anomaly detector may include multiple models such as Azure Anomaly Detector, Anomaly-Transformer, Anomaly Autoencoder, GLocalKD, STL, and RDP. Each AD will have three different models working independently to detect anomalies. An aggregator determines an attack based on the outputs of the three models. Further, the models are randomly installed on each AD. Further, the PFED incorporated in the Isidore Quantum Industrial Internet of Things (IIoT) device may be an encrypting device. Further, two encrypting devices are paired to provide communications between two trusted elements via an untrusted network. Further, any device in a network address space may be a trusted element. Further, the network address space may be a subnet in an enterprise network. Further, the device may include a smartphone, a tablet, a laptop, a desktop, a router, etc. are examples of devices in a network address space.

Further, each of the trusted elements, includes an interface, for receiving a trusted interconnect, providing a wired connection between the two encrypting devices, and the trusted element, thereby providing communications between the trusted element and the encrypting device. Further, the encrypting devices are associated with the trusted elements via trusted interconnects. Further, the two encrypting devices need to be paired to allow communication between the trusted elements.

Each sending trusted element generates native packets to be received by another trusted element. Further, the native packets may take any form that would allow the native packets to normally travel between the trusted elements without encrypting devices. Further, the native packets may include a data packet riding in a frame, an IP packet riding in an Ethernet frame, etc. Further, each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent; each encryption unit is configured with a key for encrypting and decrypting messages. For trusted elements to communicate, the encryption unit's keys of the two encrypting devices must match.

Further, the Isidore Quantum Industrial Internet of Things (IIoT) device includes interfaces and a one-way interface. Each interface may include an Ethernet port, a serial port, or a USB port. Further, the interfaces may be in communication with the trusted element interface of the trusted element via the trusted interconnect, e.g., an Ethernet cable, a serial wire, or a USB cable. Further, the interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows instructions generated by the encryption unit to be signaled to the communication unit. Further, the instructions may instruct the communication unit to halt operations.

Further, the passive interface and an active/addressable interface are both included in each communication unit. Through the connectionless interconnection, the passive interface of the communication unit of one encrypting device (PFED) is in contact with the second passive interface of the encryption unit of the other encrypting device (PFED). The address is linked to the active/addressable interface. To transmit any packets from the passive interface into a form that will be routable to the other communication unit of the paired PFED, the communication unit of one encrypting device (PFED) is paired with the communication unit of the other encrypting device (PFED). The Internet or other untrusted networks are used for communications between communication units. Further, the native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encrypting device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the PFED), the untrusted network routes the packet as necessary. A connectionless header is added to the connectionless datagram to create an incoming connectionless datagram after the communication unit of the encrypting device (PFED) removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are very separate from one another. No information is shared about the other. This is meant by "protocol-free". Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

FIG. 1 is a block diagram of an encryption retransmission Industrial Internet of Things (IIoT) device 100 for providing resiliency against attacks, in accordance with some embodiments. Accordingly, the encryption retransmission IIOT device 100 may include at least one sensor 102, a processing unit 104, a network switch 106, and a plurality of encryption retransmission devices (108, 110, and 112).

Further, the at least one sensor 102 may be configured for generating at least one sensor data by detecting at least one variable associated with the encryption retransmission IIOT device 100. Further, the at least one sensor 102 may include a temperature sensor, a humidity sensor, a water level sensor, a barometric pressure sensor, etc. Further, the at least one variable may be a physical variable such as temperature, pressure, humidity, water level, etc.

Further, the processing unit 104 may be communicatively coupled with the at least one sensor 102. Further, the processing unit 104 may be configured for analyzing the at least one sensor data for generating at least one analytics data for the at least one sensor data. Further, the at least one analytics data may include at least one analytics of the at least one variable. Further, the processing unit 104 may be a processor, a processing device, etc. Further, the analyzing of the at least one sensor data may include analyzing the at least one sensor data using at least one algorithm for the generating of the at least one analytics data.

Further, the network switch 106 may be communicatively coupled with the processing unit 104. Further, the master switch may include a plurality of ports. Further, the network switch 106 may be a seven-port Ethernet IC switch.

Further, the plurality of encryption retransmission devices (108, 110, and 112) may be connected with the network switch 106 through the plurality of ports. Further, the plurality of encryption retransmission devices (108, 110, and 112) may be protocol free encryption devices (PFEDs). Further, each of the plurality of encryption retransmission devices (108, 110, and 112) associated with each of the plurality of ports may include at least one encryption unit (EU1-EU2, EU3-EU4, . . . and EU13-FPGA) (114-116, 120-122, and 126-128) and a communication unit (CU1, CU2, . . . and CU7) (118, 124, and 130) communicatively coupled with the at least one encryption unit (114-116, 120-122, and 126-128). Further, the network switch 106 may be configured for identifying a first external device 134 from a plurality of external devices (134, 138, and 142) based on at least one information. Further, the at least one information may include at least one indication of at least one of the plurality of external devices (134, 138, and 142). Further, the first external device 134 may include a computing device, a client device, etc. Further, the plurality of external devices (134, 138, and 142) may include computing devices, client devices, etc. Further, the plurality of external devices (134, 138, and 142) may be connected with a plurality of communication units (118, 124, and 130) of the plurality of encryption retransmission devices (108, 110, and 112) via a plurality of external encryption retransmission devices (132, 136, and 140). Further, the network switch 106 may be configured for identifying a first encryption retransmission device 108 from the plurality of encryption retransmission devices (108, 110, and 112) based on the identifying of the first external device 134. Further, the network switch 106 may be configured for transferring the at least one analytics data to the first encryption retransmission device 108 based on the identifying of the first encryption retransmission device 108. Further, the first encryption retransmission device 108 may include at least one first encryption unit (114-116) and a first communication unit 118. Further, the at least one first encryption unit (114-116) may be configured for encrypting an egressing native packet comprising the at least one analytics data using at least one encryption key to create an encrypted egressing native packet based on the transferring of the at least one analytics data. Further, the at least one first encryption unit (114-116) may be configured for adding a connectionless header to the encrypted egressing native packet to form an egressing connectionless datagram. Further, the first communication unit 118 may be communicatively coupled with the at least one first encryption unit (114-116). Further, the first communication unit 118 may be paired with a first external communication unit of a first external encryption retransmission device 132 connected to the first external device 134. Further, the first communication unit 118 may be configured for receiving the egressing connectionless datagram. Further, the first communication unit 118 may be configured for adding a complex header to the egressing connectionless datagram for forming an egressing packet for delivery to the first external encryption retransmission device 132.

Figure 2:
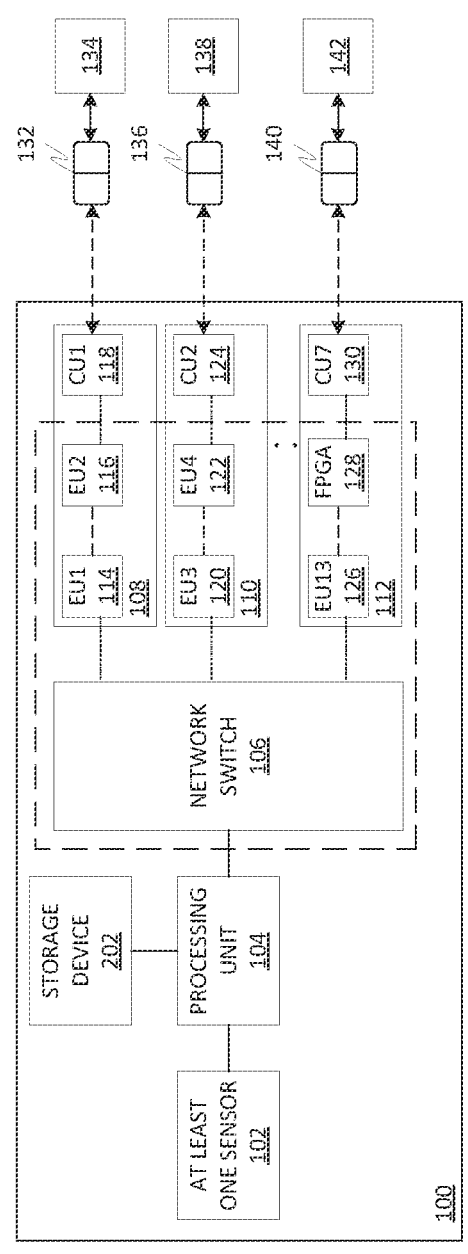
FIG. 2 is a block diagram of the encryption retransmission Industrial Internet of Things (IIoT) device 100, in accordance with some embodiments.

In further embodiments, the encryption retransmission IIOT device 100 may include a storage device 202, as shown in FIG. 2, communicatively coupled with the processing unit 104. Further, the storage device 202 may be configured for storing the at least one sensor data. Further, the storage device 202 may include a memory. Further, the memory may be a flash memory.

Further, in some embodiments, the processing unit 104 may include a System on Chip (SoC).

Figure 3:
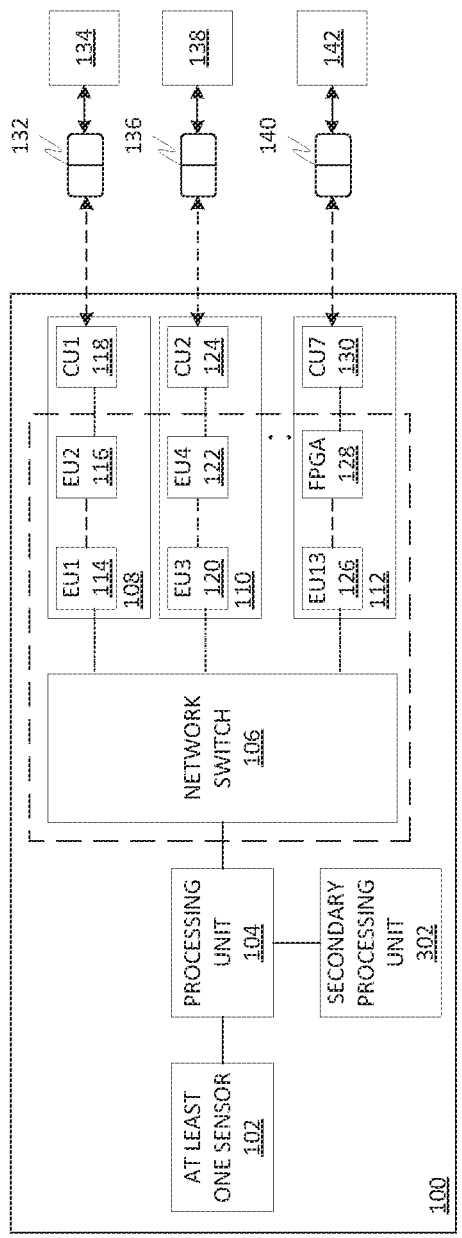
FIG. 3 is a block diagram of the encryption retransmission Industrial Internet of Things (IIoT) device 100, in accordance with some embodiments.

In further embodiments, the encryption retransmission IIOT device 100 may include a secondary processing unit 302, as shown in FIG. 3, communicatively coupled with the processing unit 104. Further, the secondary processing unit 302 may be configured for performing at least one administrative task associated with at least one of the processing unit 104 and the at least one sensor 102. Further, the generating of the at least one sensor data and the analyzing of the at least one sensor data may be based on the performing of the at least one administrative task.

Further, in an embodiment, the secondary processing unit 302 may include a System on Chip (SoC).

Figure 4:
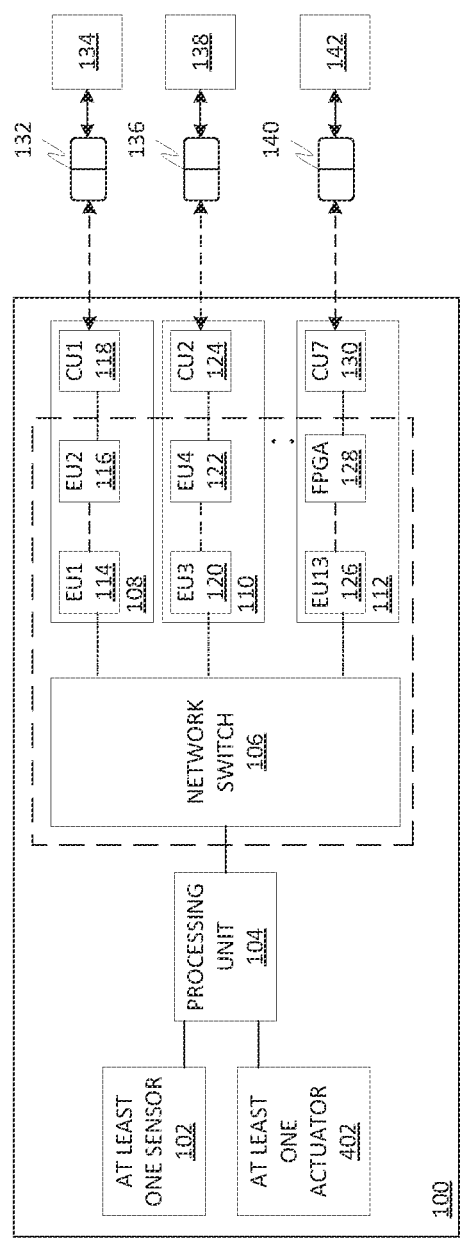
FIG. 4 is a block diagram of the encryption retransmission Industrial Internet of Things (IIoT) device 100, in accordance with some embodiments.

In further embodiments, the encryption retransmission IIoT device 100 may include at least one actuator 402, as shown in FIG. 4, communicatively coupled with the processing unit 104. Further, the processing unit 104 may be further configured for generating at least one operation data. Further, the at least one actuator 402 may be configured for performing at least one operation associated with the encryption retransmission IIOT device 100 based on the at least one operation data. Further, the at least one operation may include an actuating operation, etc.

Further, in an embodiment, the first communication unit 118 may be configured for receiving an ingressing packet comprising an encrypted ingressing native packet and a complex header from the first external encryption retransmission device 132. Further, the first communication unit 118 may be configured for removing the complex header from the ingressing packet. Further, the first communication unit 118 may be configured for adding a connectionless header to the ingressing packet for forming an ingressing connectionless datagram. Further, the ingressing connectionless datagram may include the encrypted ingressing native packet. Further, the at least one first encryption unit (114-116) may be configured for receiving the ingressing connectionless datagram comprising the ingressing encrypted native packet. Further, the at least one first encryption unit (114-116) may be configured for decrypting the encrypted ingressing native packet using the at least one encryption key to obtain an ingressing native packet. Further, the ingressing native packet may include at least one first information. Further, the at least one first information may include at least one parameter of the at least one operation. Further, the network switch 106 may be further configured for transferring the at least one first information to the processing unit 104 based on the obtaining of the ingressing native packet. Further, the processing unit 104 may be configured for analyzing the at least one first information based on the transferring of the at least one first information. Further, the generating of the at least one operation data may be further based on the analyzing of the at one first information.

Further, in some embodiments, the at least one encryption unit (114-116, 120-122, and 126-128) of each of the plurality of encryption retransmission devices (108, 110, and 112) may include two encryption units. Further, the two encryption units may be communicatively coupled.

Further, in some embodiments, the plurality of encryption retransmission devices (108, 110, and 112) may include a control encryption retransmission device 112 connected with the network switch 106 through a control port (management port) of the plurality of ports. Further, the control encryption retransmission device 112 may be connected to a control external device 142 via a control external encryption retransmission device 140 of the plurality of external encryption retransmission devices (132, 136, and 140). Further, the control external device 142 may include a computing device, a client device, an input device, etc.

Further, in an embodiment, the control encryption retransmission device 112 may include at least one control encryption unit (EU 13 and FPGA) (126-128) and a control communication unit (CU7) 130 communicatively coupled with the at least one control encryption unit (126-128). Further, the control communication unit 130 may be paired with a control external communication unit of the control external encryption retransmission device 140 connected to the control external device 142. Further, the control communication unit 130 may be configured for receiving a control ingressing packet comprising a control encrypted ingressing native packet and a complex header from the control external encryption retransmission device 140. Further, the control communication unit 130 may be configured for removing the complex header from the control ingressing packet. Further, the control communication unit 130 may be configured for adding a connectionless header to the control ingressing packet for forming a control ingressing connectionless datagram. Further, the control ingressing connectionless datagram may include the control encrypted ingressing native packet. Further, the at least one control encryption unit (126-128) may be configured for receiving the control ingressing connectionless datagram comprising the control ingressing encrypted native packet. Further, the at least one control encryption unit (126-128) may be configured for decrypting the control encrypted ingressing native packet using the at least one encryption key to obtain a control ingressing native packet. Further, the control ingressing native packet may include the at least one information.

Further, in an embodiment, the at least one control encryption unit (126-128) may include an encryption unit (EU13) 126 and a field-programmable gate array (FPGA) 128 communicatively coupled with the encryption unit 126.

Further, in some embodiments, the at least one encryption unit (114-116, 120-122, and 126-128) of each of the plurality of encryption retransmission devices (108, 110, and 112) may be communicatively coupled to the communication unit (118, 124, and 130) of each of the plurality of encryption retransmission devices (108, 110, and 112) via a one-way connection for providing at least one instruction to the communication unit (118, 124, and 130).

Figure 5:
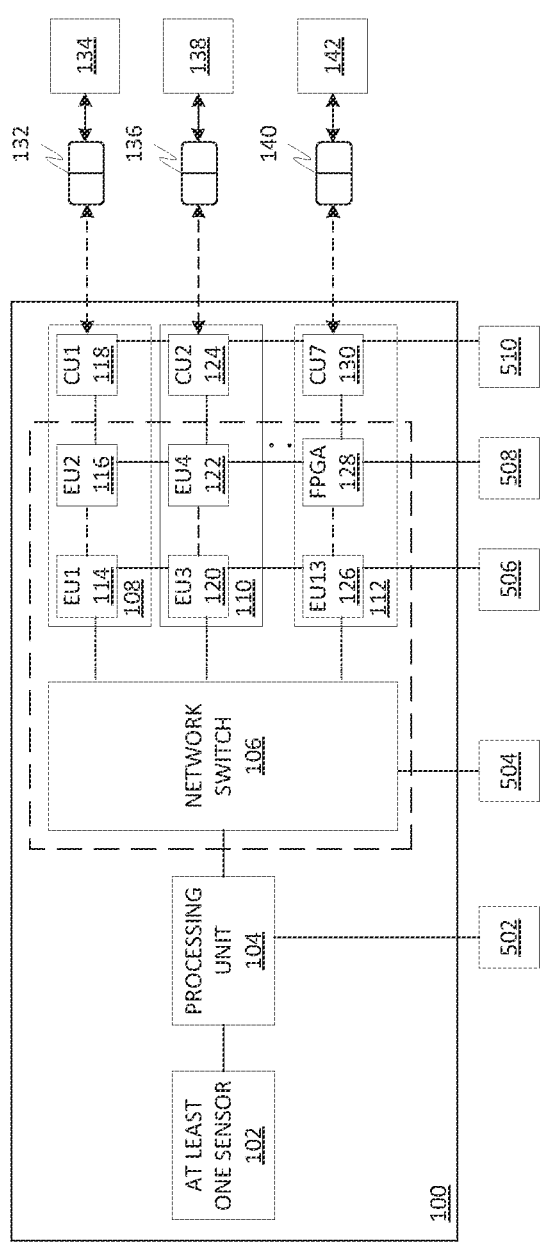
FIG. 5 is a block diagram of the encryption retransmission Industrial Internet of Things (IIoT) device 100, in accordance with some embodiments.

In further embodiments, the encryption retransmission IIOT device 100 may include at least one anomaly detector (502-510), as shown in FIG. 5, communicatively coupled with at least one of the processing unit 104, the network switch 106, and the plurality of encryption retransmission devices (108, 110, and 112). Further, the at least one anomaly detector (502-510) may be an anti-temper unit, an anomaly detector, etc. Further, the at least one anomaly detector (502-510) may include a processing unit, a communication interface, a memory, etc. Further, the at least one anomaly detector (502-510) may be configured for analyzing at least one signal associated with at least one of the processing unit 104, the network switch 106, and the plurality of encryption retransmission devices (108, 110, and 112) using at least one machine learning model. Further, the at least one anomaly detector (502-510) may be configured for determining an attack associated with at least one of the processing unit 104, the network switch 106, and the plurality of encryption retransmission devices (108, 110, and 112) based on the analyzing. Further, the at least one anomaly detector (502-510) may be configured for generating an alert for the attack based on the determining of the attack.

FIG. 2 is a block diagram of the encryption retransmission Industrial Internet of Things (IIoT) device 100, in accordance with some embodiments.

FIG. 3 is a block diagram of the encryption retransmission Industrial Internet of Things (IIoT) device 100, in accordance with some embodiments.

FIG. 4 is a block diagram of the encryption retransmission Industrial Internet of Things (IIoT) device 100, in accordance with some embodiments.

FIG. 5 is a block diagram of the encryption retransmission Industrial Internet of Things (IIoT) device 100, in accordance with some embodiments.

Figure 6:
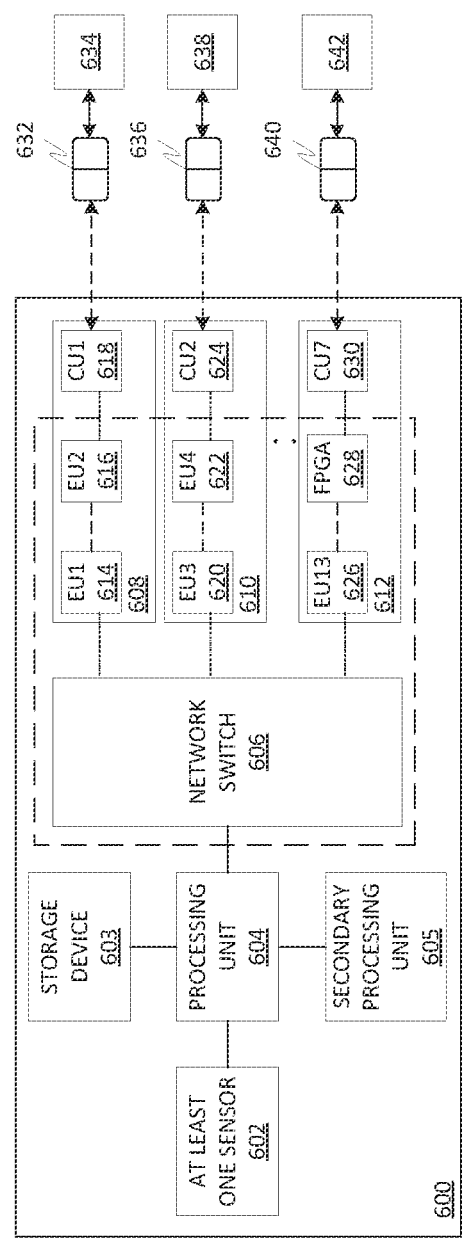
FIG. 6 is a block diagram of an encryption retransmission Industrial Internet of Things (IIoT) device 600 for providing resiliency against attacks, in accordance with some embodiments.

FIG. 6 is a block diagram of an encryption retransmission Industrial Internet of Things (IIoT) device 600 for providing resiliency against attacks, in accordance with some embodiments. Accordingly, the encryption retransmission IIoT device 600 may include at least one sensor 602, a processing unit 604, a storage device 603, a secondary processing unit 605, a network switch 606, and a plurality of encryption retransmission devices (608, 610, and 612).

Further, the at least one sensor 602 may be configured for generating at least one sensor data by detecting at least one variable associated with the encryption retransmission IIOT device 600.

Further, the processing unit 604 may be communicatively coupled with the at least one sensor 602. Further, the processing unit 604 may be configured for analyzing the at least one sensor data for generating at least one analytics data for the at least one sensor data.

Further, the storage device 603 may be communicatively coupled with the processing unit 604. Further, the storage device 603 may be configured for storing the at least one sensor data.

Further, the secondary processing unit 605 may be communicatively coupled with the processing unit 604. Further, the secondary processing unit 605 may be configured for performing at least one administrative task associated with at least one of the processing unit 604 and the at least one sensor 602. Further, the generating of the at least one sensor data and the analyzing of the at least one sensor data may be based on the performing of the at least one administrative task.

Further, the network switch 606 may be communicatively coupled with the processing unit 604. Further, the master switch may include a plurality of ports.

Further, the plurality of encryption retransmission devices (608, 610, and 612) may be connected with the network switch 606 through the plurality of ports. Further, each of the plurality of encryption retransmission devices (608, 610, and 612) associated with each of the plurality of ports may include at least one encryption unit (614-616, 620-622, and 626-628) and a communication unit (618, 624, and 630) communicatively coupled with the at least one encryption unit (614-616, 620-622, and 626-628). Further, the network switch 606 may be configured for identifying a first external device 634 from a plurality of external devices (634, 638, and 642) based on at least one information. Further, the plurality of external devices (634, 638, and 642) may be connected with a plurality of communication units (618, 624, 630) of the plurality of encryption retransmission devices (608, 610, and 612) via a plurality of external encryption retransmission devices (632, 636, and 640). Further, the network switch 606 may be configured for identifying a first encryption retransmission device 608 from the plurality of encryption retransmission devices (608, 610, and 612) based on the identifying of the first external device 634. Further, the network switch 606 may be configured for transferring the at least one analytics data to the first encryption retransmission device 608 based on the identifying of the first encryption retransmission device 608. Further, the first encryption retransmission device 608 may include at least one first encryption unit (614-616) and a first communication unit 618. Further, the at least one first encryption unit (614-616) may be configured for encrypting an egressing native packet comprising the at least one analytics data using at least one encryption key to create an encrypted egressing native packet based on the transferring of the at least one analytics data. Further, the at least one first encryption unit (614-616) may be configured for adding a connectionless header to the encrypted egressing native packet to form an egressing connectionless datagram. Further, the first communication unit 618 may be communicatively coupled with the at least one first encryption unit (614-616). Further, the first communication unit 618 may be paired with a first external communication unit of a first external encryption retransmission device 632 connected to the first external device 634. Further, the first communication unit 618 may be configured for receiving the egressing connectionless datagram. Further, the first communication unit 618 may be configured for adding a complex header to the egressing connectionless datagram for forming an egressing packet for delivery to the first external encryption retransmission device 632.

Further, in some embodiments, the at least one encryption unit (614-616, 620-622, and 626-628) of each of the plurality of encryption retransmission devices (608, 610, and 612) may include two encryption units. Further, the two encryption units may be communicatively coupled.

Further, in some embodiments, the plurality of encryption retransmission devices (608, 610, and 612) may include a control encryption retransmission device 612 connected with the network switch 606 through a control port of the plurality of ports. Further, the control encryption retransmission device 612 may be connected to a control external device 642 via a control external encryption retransmission device 640 of the plurality of external encryption retransmission devices (632, 636, and 640).

Further, in an embodiment, the control encryption retransmission device 612 may include at least one control encryption unit (626-628) and a control communication unit 630 communicatively coupled with the at least one control encryption unit (626-628). Further, the control communication unit 630 may be paired with a control external communication unit of the control external encryption retransmission device 640 connected to the control external device 642. Further, the control communication unit 630 may be configured for receiving a control ingressing packet comprising a control encrypted ingressing native packet and a complex header from the control external encryption retransmission device 640. Further, the control communication unit 630 may be configured for removing the complex header from the control ingressing packet. Further, the control communication unit 630 may be configured for adding a connectionless header to the control ingressing packet for forming a control ingressing connectionless datagram. Further, the control ingressing connectionless datagram may include the control encrypted ingressing native packet. Further, the at least one control encryption unit (626-628) may be configured for receiving the control ingressing connectionless datagram comprising the control ingressing encrypted native packet. Further, the at least one control encryption unit (626-628) may be configured for decrypting the control encrypted ingressing native packet using the at least one encryption key to obtain a control ingressing native packet. Further, the control ingressing native packet may include the at least one information.

Further, in an embodiment, the at least one control encryption unit (626-628) may include an encryption unit 626 and a field-programmable gate array (FPGA) 628 communicatively coupled with the encryption unit 626.

In further embodiments, the encryption retransmission IIOT device 600 may include at least one anomaly detector communicatively coupled with at least one of the processing unit 604, the network switch 606, and the plurality of encryption retransmission devices (608, 610, and 612). Further, the at least one anomaly detector may be configured for analyzing at least one signal associated with at least one of the processing unit 604, the network switch 606, and the plurality of encryption retransmission devices (608, 610, and 612) using at least one machine learning model. Further, the at least one anomaly detector may be configured for determining an attack associated with at least one of the processing unit 604, the network switch 606, and the plurality of encryption retransmission devices (608, 610, and 612) based on the analyzing. Further, the at least one anomaly detector may be configured for generating an alert for the attack based on the determining of the attack.

Figure 7:
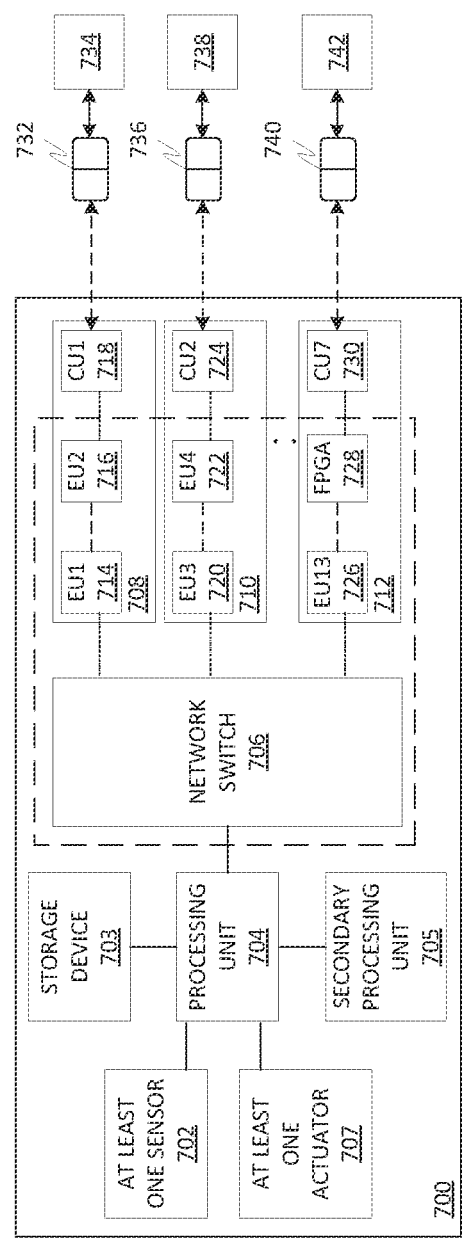
FIG. 7 is a block diagram of an encryption retransmission Industrial Internet of Things (IIoT) device 700 for providing resiliency against attacks, in accordance with some embodiments.

FIG. 7 is a block diagram of an encryption retransmission Industrial Internet of Things (IIoT) device 700 for providing resiliency against attacks, in accordance with some embodiments. Accordingly, the encryption retransmission IIOT device 700 may include at least one sensor 702, at least one actuator 707, a processing unit 704, a storage device 703, a secondary processing unit 705, a network switch 706, and a plurality of encryption retransmission devices (708, 710, and 712).

Further, the at least one sensor 702 may be configured for generating at least one sensor data by detecting at least one variable associated with the encryption retransmission IIOT device 700.

Further, the at least one actuator 707 may be configured for performing at least one operation associated with the encryption retransmission IIOT device 700 based on at least one operation data.

Further, the processing unit 704 may be communicatively coupled with the at least one sensor 702 and the at least one actuator 707. Further, the processing unit 704 may be configured for analyzing the at least one sensor data for generating at least one analytics data for the at least one sensor data. Further, the processing unit 704 may be configured for generating the at least one operation data.

Further, the storage device 703 may be communicatively coupled with the processing unit 704. Further, the storage device 703 may be configured for storing the at least one sensor data.

Further, the secondary processing unit 705 may be communicatively coupled with the processing unit 704. Further, the secondary processing unit 705 may be configured for performing at least one administrative task associated with at least one of the processing unit 704 and the at least one sensor 702. Further, the generating of the at least one sensor data and the analyzing of the at least one sensor data may be based on the performing of the at least one administrative task.

Further, the network switch 706 may be communicatively coupled with the processing unit 704. Further, the master switch may include a plurality of ports.

Further, the plurality of encryption retransmission devices (708, 710, and 712) may be connected with the network switch 706 through the plurality of ports. Further, each of the plurality of encryption retransmission devices (708, 710, and 712) associated with each of the plurality of ports may include at least one encryption unit (714-716, 720-722, and 726-728) and a communication unit (718, 724, and 730) communicatively coupled with the at least one encryption unit (714-716, 720-722, and 726-728). Further, the network switch 706 may be configured for identifying a first external device 734 from a plurality of external devices (734, 738, and 742) based on at least one information. Further, the plurality of external devices (734, 738, and 742) may be connected with a plurality of communication units (718, 724, and 730) of the plurality of encryption retransmission devices (708, 710, and 712) via a plurality of external encryption retransmission devices (732, 736, and 740). Further, the network switch 706 may be configured for identifying a first encryption retransmission device 708 from the plurality of encryption retransmission devices (708, 710, and 712) based on the identifying of the first external device 734. Further, the network switch 706 may be configured for transferring the at least one analytics data to the first encryption retransmission device 708 based on the identifying of the first encryption retransmission device 708. Further, the first encryption retransmission device 708 may include at least one first encryption unit (714-716) and a first communication unit 718. Further, the at least one first encryption unit (714-716) may be configured for encrypting an egressing native packet comprising the at least one analytics data using at least one encryption key to create an encrypted egressing native packet based on the transferring of the at least one analytics data. Further, the at least one first encryption unit (714-716) may be configured for adding a connectionless header to the encrypted egressing native packet to form an egressing connectionless datagram. Further, the first communication unit 718 may be communicatively coupled with the at least one first encryption unit (714-716). Further, the first communication unit 718 may be paired with a first external communication unit of a first external encryption retransmission device 732 connected to the first external device 734. Further, the first communication unit 718 may be configured for receiving the egressing connectionless datagram. Further, the first communication unit 718 may be configured for adding a complex header to the egressing connectionless datagram for forming an egressing packet for delivery to the first external encryption retransmission device 732. Further, the first communication unit 718 may be configured for receiving an ingressing packet comprising an encrypted ingressing native packet and a complex header from the first external encryption retransmission device 732. Further, the first communication unit 718 may be configured for removing the complex header from the ingressing packet. Further, the first communication unit 718 may be configured for adding a connectionless header to the ingressing packet for forming an ingressing connectionless datagram. Further, the ingressing connectionless datagram may include the encrypted ingressing native packet. Further, the at least one first encryption unit (714-716) may be configured for receiving the ingressing connectionless datagram comprising the ingressing encrypted native packet. Further, the at least one first encryption unit (714-716) may be configured for decrypting the encrypted ingressing native packet using the at least one encryption key to obtain an ingressing native packet. Further, the ingressing native packet may include at least one first information. Further, the network switch 706 may be further configured for transferring the at least one first information to the processing unit 704 based on the obtaining of the ingressing native packet. Further, the processing unit 704 may be configured for analyzing the at least one first information based on the transferring of the at least one first information. Further, the generating of the at least one operation data may be further based on the analyzing of the at one first information.

Figure 8:
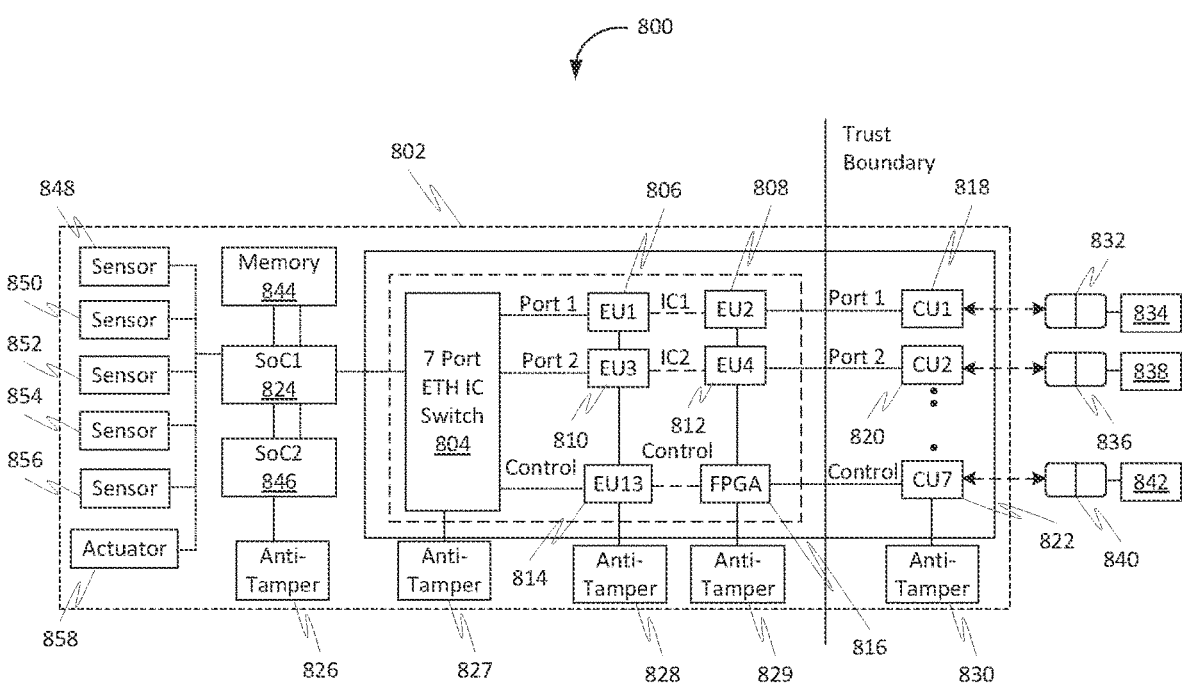
FIG. 8 is a schematic diagram of an encryption retransmission Industrial Internet of Things (IIoT) device 800 for providing resiliency against attacks, in accordance with some embodiments.

FIG. 8 is a schematic diagram of an encryption retransmission Industrial Internet of Things (IIoT) device 800 for providing resiliency against attacks, in accordance with some embodiments. Further, the encryption retransmission IIOT device 800 may include a seven-port Ethernet IC switch 804. Further, the encryption retransmission IIOT device 800 may include a plurality of sensors 848-856, an actuator 858, a memory 844, a SoC1 824, and a SoC2 846. Further, the plurality of sensors 848-856 and the actuator 858 may be communicatively coupled with the SoC1 824. Further, the memory 844 and the SoC2 846 may be communicatively coupled with the SoC1 824. Further, the SoC1 824 may be communicatively coupled with the seven-port Ethernet IC switch 804. Further, the seven-port Ethernet IC switch 804 may include a plurality of ports. Further, the plurality of ports may include port 1, port 2, control port, etc. Further, the encryption retransmission IIOT device 800 may include two encryption units (EU1 (806) and EU2 (808)) that are coupled together and connected to the seven-port Ethernet IC switch 804 through the port 1, a communication unit (CU1 (818)) coupled with the two encryption units (EU1 (806) and EU2 (808)) on the port 1, and a first external encryption retransmission device 832 which is coupled with the communication unit (CU1 (818)), is coupled with a device (such as sensors, IoTs, etc.) 834. Further, the encryption retransmission IIOT device 800 may include two encryption units (EU3 (810) and EU4 (812)) that are coupled together and connected to the seven-port Ethernet IC switch 804 through the port 2, a communication unit (CU2 (820)) coupled with the two encryption units (EU3 (810) and EU4 (812)) on the port 2, and a second external encryption retransmission device 836 which is coupled with the communication unit (CU2 (820)), is coupled with a device (such as laptops, smartphones, CubeStats, computers, etc.) 838. Further, the encryption retransmission IIOT device 800 may include an encryption unit (EU13 (814)) and a FPGA (816) that are coupled together and connected to the seven-port Ethernet IC switch 804 through the control port, a communication unit (CU7 (822)) coupled with the FPGA (816) on the control port, and a third external encryption retransmission device 840 which is coupled with the communication unit (CU7 (822)), is coupled with a device 842. Further, the encryption retransmission IIOT device 800 may include at least one anti tamper unit 826-830 coupled with the encryption units (EU1 (806), EU3 (810), and EU13 (814)), the encryption units (EU2 (808) and EU4 (812)) and the FPGA 816, the communication units (CU1 (818), CU2 (820), and CU7 (822)), the seven-port Ethernet IC switch 804, the memory 844, SoC1 824, and SoC2 846.

Figure 9:
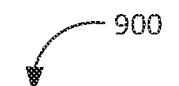
FIG. 9 is a rear top perspective view of an encryption retransmission Industrial Internet of Things (IIoT) device 900 for providing resiliency against attacks, in accordance with some embodiments.
Figure 9:
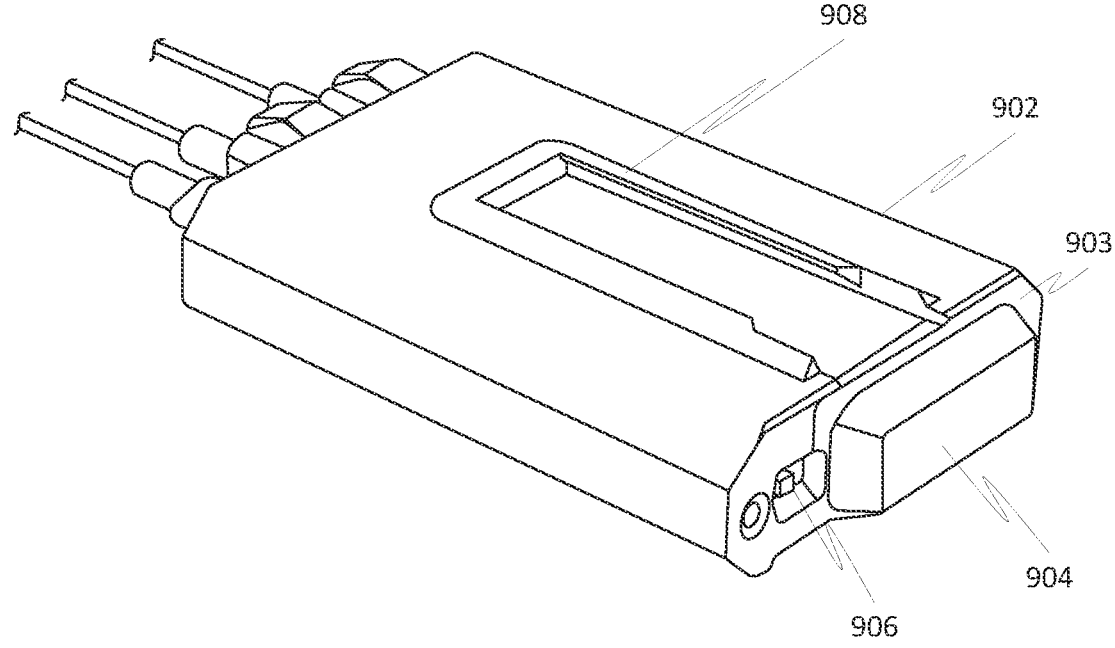

FIG. 9 is a rear top perspective view of an encryption retransmission Industrial Internet of Things (IIoT) device 900 for providing resiliency against attacks, in accordance with some embodiments. Accordingly, the encryption retransmission IIOT device 900 may include an enclosure 902 and an end plate 903 attached to the enclosure 902. Further, the encryption retransmission IIOT device 900 may include an antenna compartment 904 comprised in the end plate 903. Further, the encryption retransmission IIOT device 900 secures Ethernet, USB, 4G/5G, Bluetooth, and Infrared communications. Further, the encryption retransmission IIOT device 900 may include a communication unit associated with the antenna compartment 904. Further, the encryption retransmission IIOT device 900 may include a reset button 906 comprised in the end plate 903. Further, the enclosure 902 may include a slot 908 on a surface of the enclosure 902. Further, the slot 908 may be a connector for connecting an additional device to the encryption retransmission IIOT device 900. Further, the additional device may be snapped onto the encryption retransmission IIOT device 900 using the slot 908.

Figure 10:
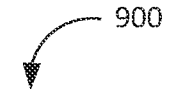
FIG. 10 is an exploded front top perspective view of the encryption retransmission Industrial Internet of Things (IIoT) device 900, in accordance with some embodiments.
Figure 10:
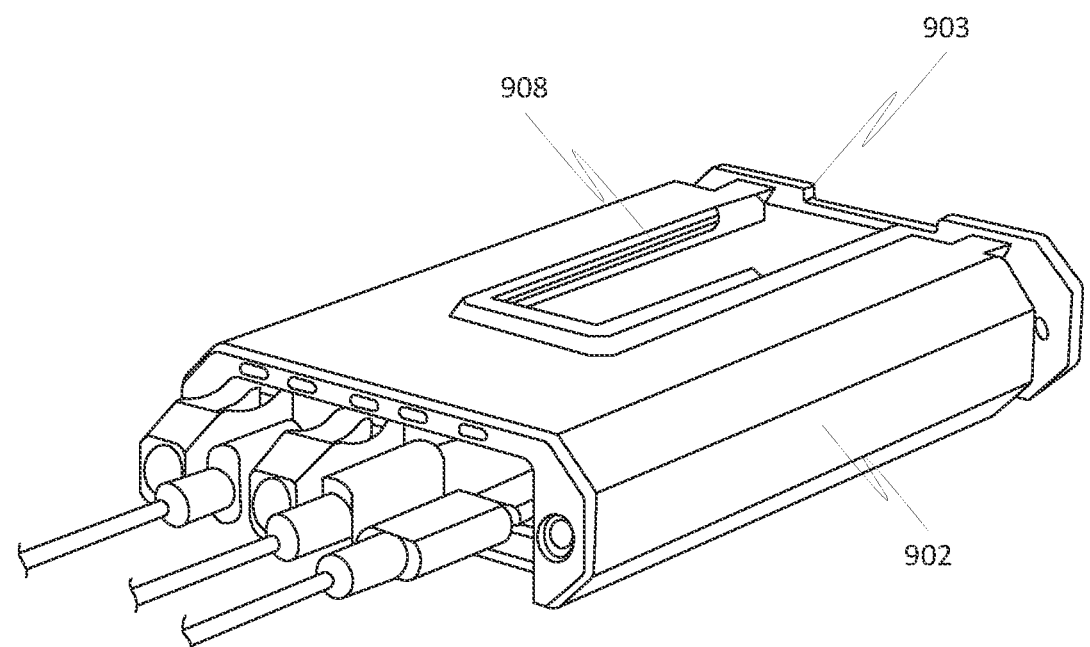

FIG. 10 is an exploded front top perspective view of the encryption retransmission Industrial Internet of Things (IIoT) device 900, in accordance with some embodiments.

Figure 11:
FIG. 11 is an exploded side perspective view of the encryption retransmission Industrial Internet of Things (IIoT) device 900, in accordance with some embodiments.
Figure 11:
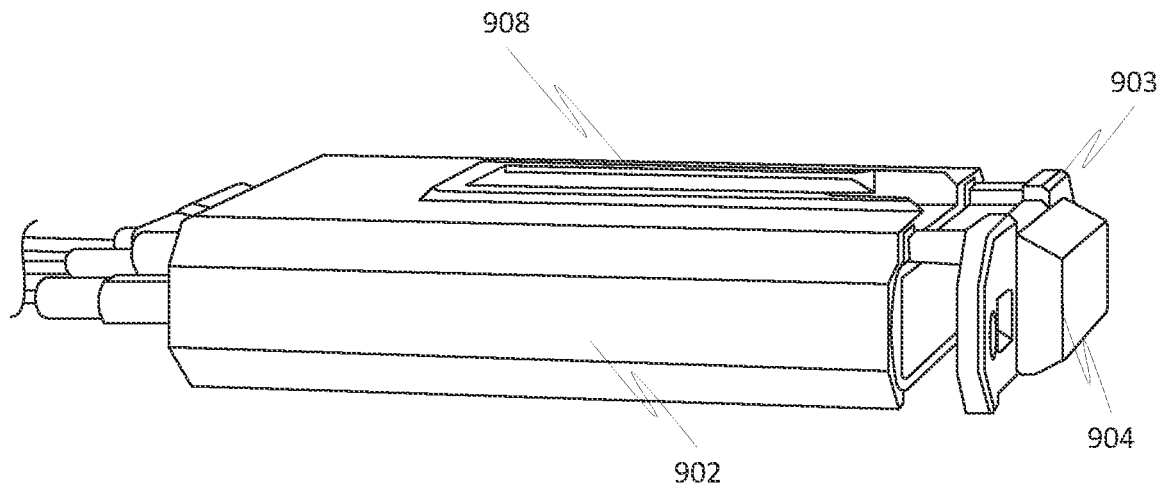

FIG. 11 is an exploded side perspective view of the encryption retransmission Industrial Internet of Things (IIoT) device 900, in accordance with some embodiments.

Figure 12:
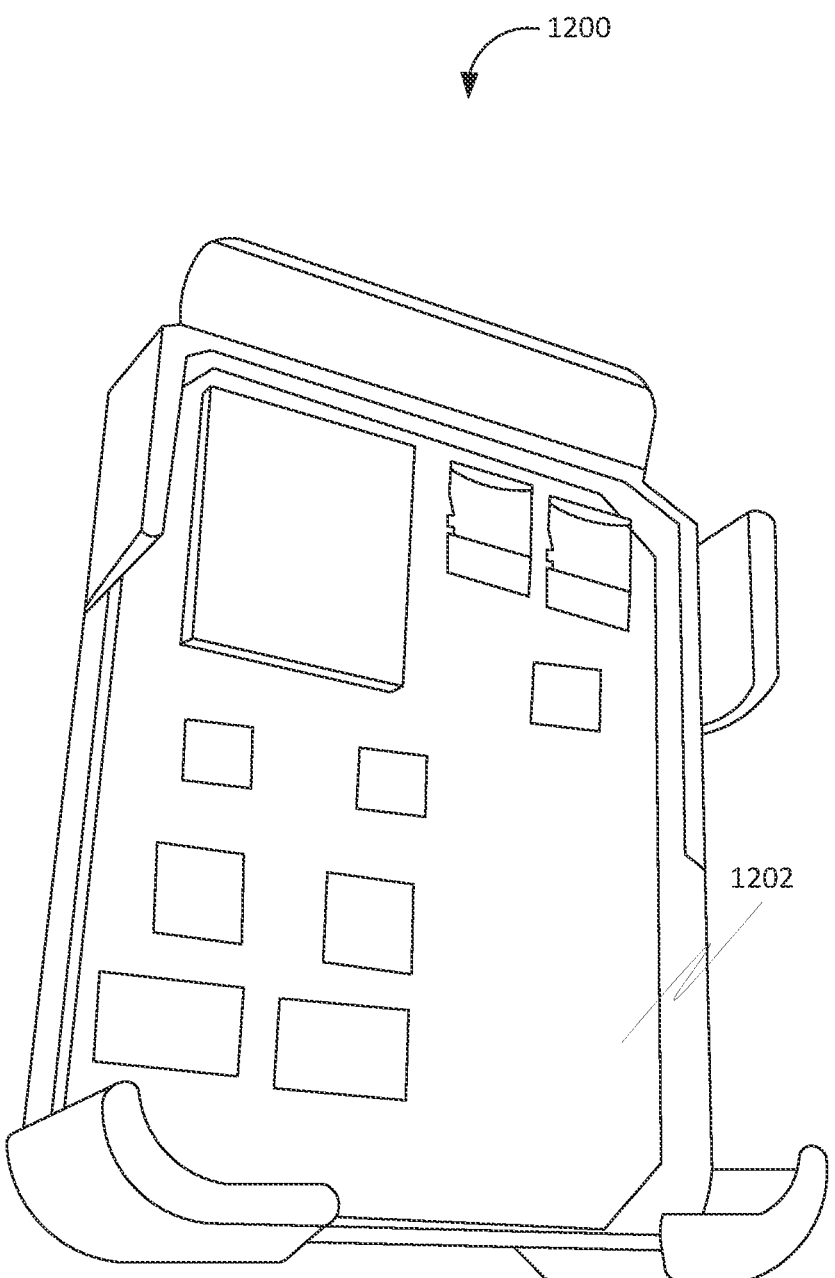
FIG. 12 is a top perspective view of an encryption retransmission Industrial Internet of Things (IIoT) device 1200 for providing resiliency against attacks, in accordance with some embodiments.

FIG. 12 is a top perspective view of an encryption retransmission Industrial Internet of Things (IIoT) device 1200 for providing resiliency against attacks, in accordance with some embodiments. Further, the encryption retransmission IIOT device 1200 may include a PCB 1204. Further, the PCB 1204 may include a plurality of components of the encryption retransmission IIOT device 1200. Further, the plurality of components may include a seven-port Ethernet IC switch, a plurality of sensors, an actuator, a memory, a SoC1, a SoC2, two encryption units that are coupled together and connected to port 1 of the seven-port Ethernet IC switch and a communication unit coupled with the two encryption units on the port 1, two encryption units that are coupled together and connected to port 2 of the seven-port Ethernet IC switch and a communication unit coupled with the two encryption units on the port 2, an encryption unit and a FPGA that are coupled together and connected to a control port of the seven-port Ethernet IC switch and a communication unit coupled with the FPGA on the control port, and at least one anti tamper unit.

Figure 13:
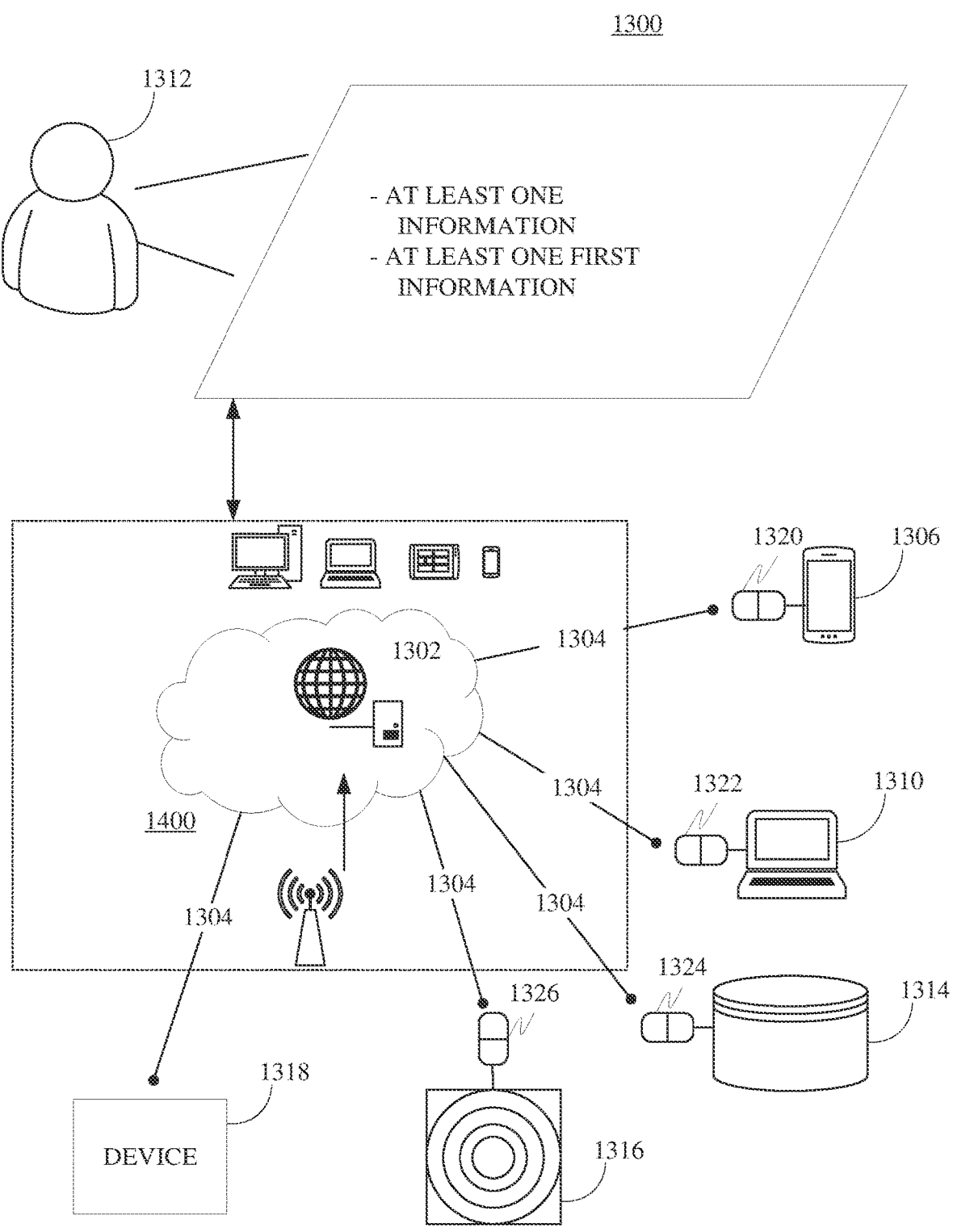
FIG. 13 is an illustration of an online platform consistent with various embodiments of the present disclosure.

FIG. 13 is an illustration of an online platform 1300 consistent with various embodiments of the present disclosure. By way of non-limiting example, the online platform 1300 to provide resiliency against attacks may be hosted on a centralized server 1302, such as, for example, a cloud computing service. The centralized server 1302 may communicate with other network entities, such as, for example, a mobile device 1306 (such as a smartphone, a laptop, a tablet computer, etc.), other electronic devices 1310 (such as desktop computers, server computers, etc.), databases 1314, sensors 1316, and a device 1318 (such as the encryption retransmission IIOT device 100, the encryption retransmission IIOT device 600, the encryption retransmission IIOT device 700, the encryption retransmission IIoT device 900, and the encryption retransmission IIOT device 1200) over a communication network 1304, such as, but not limited to, the Internet. Further, the mobile device 1316 may be connected with a first encryption retransmission device 1320, the electronic device 1310 may be connected with a second encryption retransmission device 1322, the databases 1314 may be connected with a third encryption retransmission device 1324, the sensors 1316 may be connected with a fourth encryption retransmission device 1324. Further, the network entities may communicate with each other using an encryption retransmission device connected with each network entity. Further, users of the online platform 1300 may include relevant parties such as, but not limited to, end-users, administrators, service providers, service consumers, and so on. Accordingly, in some instances, electronic devices operated by the one or more relevant parties may be in communication with the platform.

A user 1312, such as the one or more relevant parties, may access online platform 1300 through a web-based software application or browser. The web-based software application may be embodied as, for example, but not be limited to, a website, a web application, a desktop application, and a mobile application compatible with a computing device 1400.

Figure 14:
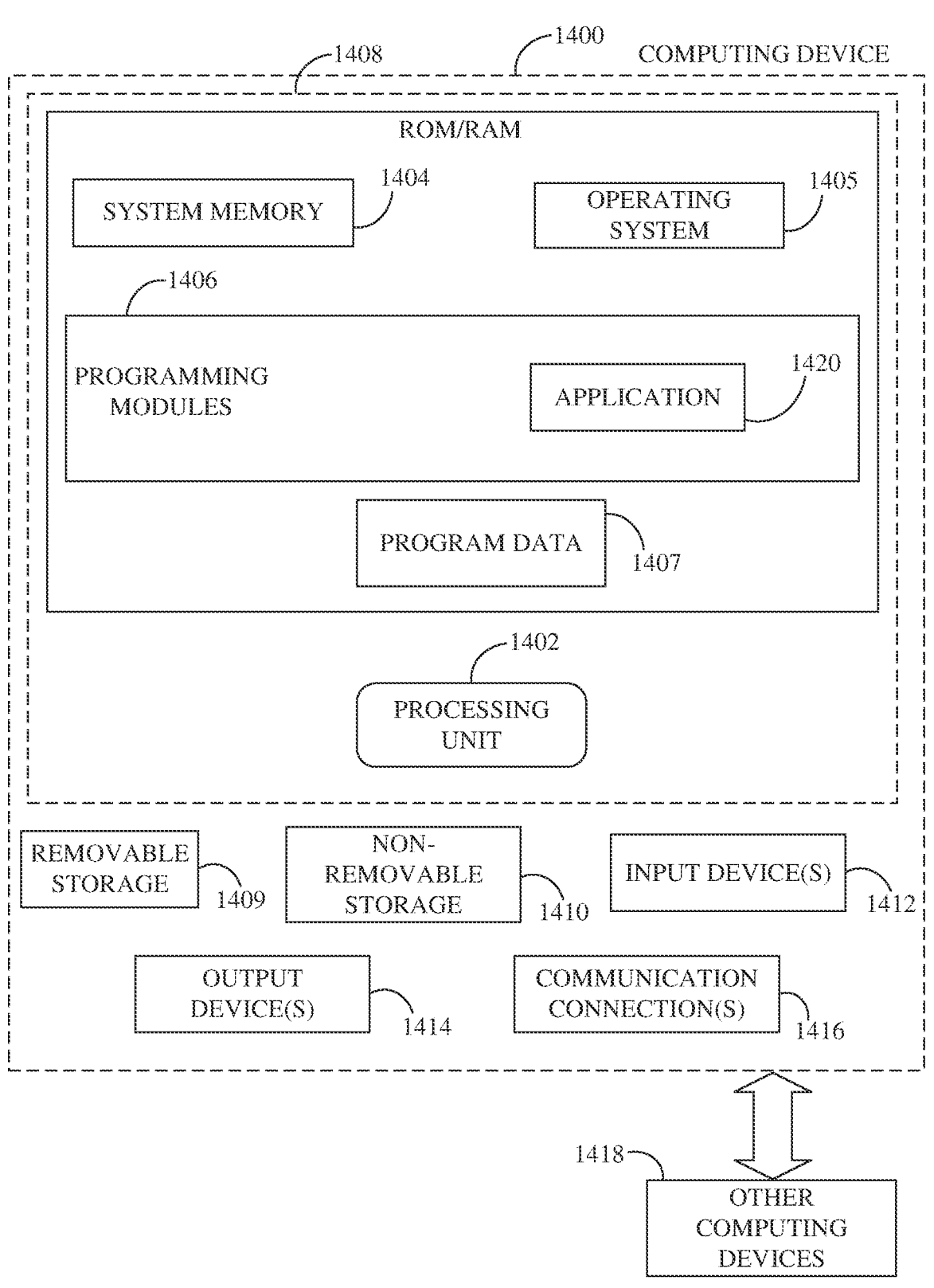
FIG. 14 is a block diagram of a computing device for implementing the methods disclosed herein, in accordance with some embodiments.

With reference to FIG. 14, a system consistent with an embodiment of the disclosure may include a computing device or cloud service, such as computing device 1400. In a basic configuration, computing device 1400 may include at least one processing unit 1402 and a system memory 1404. Depending on the configuration and type of computing device, system memory 1404 may comprise, but is not limited to, volatile (e.g., random-access memory (RAM)), non-volatile (e.g., read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include machine learning module. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and non-volatile, removable and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, a location sensor, a camera, a biometric sensor, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1404, including operating system 1405. While executing on processing unit 1402, programming modules 1406 may perform processes including, for example, one or more stages of methods, algorithms, systems, applications, servers, databases as described above. The aforementioned process is an example, and processing unit 1402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An encryption retransmission Industrial Internet of Things (IIoT) device for providing resiliency against attacks, the encryption retransmission IIoT device comprising:

at least one sensor configured for generating at least one sensor data by detecting at least one variable associated with the encryption retransmission IIoT device;

a processing unit communicatively coupled with the at least one sensor, wherein the processing unit is configured for analyzing the at least one sensor data for generating at least one analytics data for the at least one sensor data;

a network switch communicatively coupled with the processing unit, wherein the network switch comprises a plurality of ports, wherein the network switch is positioned on an encrypted side of a trust boundary of the encryption retransmission IIoT device such that the network switch is not accessible from an unencrypted side of the trust boundary without passing through at least one encryption unit of a plurality of encryption retransmission devices; and the plurality of encryption retransmission devices connected with the network switch through the plurality of ports, wherein each of the plurality of encryption retransmission devices associated with each of the plurality of ports comprises at least one encryption unit and a communication unit communicatively coupled with the at least one encryption unit, wherein the network switch is configured for:

identifying a first external device from a plurality of external devices based on at least one information, wherein the plurality of external devices is connected with a plurality of communication units of the plurality of encryption retransmission devices via a plurality of external encryption retransmission devices;

identifying a first encryption retransmission device from the plurality of encryption retransmission devices based on the identifying of the first external device; and transferring the at least one analytics data to the first encryption retransmission device based on the identifying of the first encryption retransmission device, wherein the first encryption retransmission device comprises:

at least one first encryption unit configured for:

encrypting an egressing native packet comprising the at least one analytics data using at least one encryption key to create an encrypted egressing native packet based on the transferring of the at least one analytics data; and adding a connectionless header to the encrypted egressing native packet to form an egressing connectionless datagram; and a first communication unit communicatively coupled with the at least one first encryption unit, wherein the first communication unit is paired with a first external communication unit of the first external encryption retransmission device connected to the first external device, wherein the first communication unit is configured for:

receiving the egressing connectionless datagram; and adding a complex header to the egressing connectionless datagram for forming an egressing packet for delivery to the first external encryption retransmission device;

wherein the plurality of encryption retransmission devices comprises a control encryption retransmission device connected with the network switch through a control port of the plurality of ports, wherein the control encryption retransmission device is connected to a control external device via a control external encryption retransmission device of the plurality of external encryption retransmission devices.

2. The encryption retransmission IIoT device of claim 1 further comprising a storage device communicatively coupled with the processing unit, wherein the storage device is configured for storing the at least one sensor data.

3. The encryption retransmission IIoT device of claim 1, wherein the processing unit comprises a System on Chip (SoC).

4. The encryption retransmission IIoT device of claim 1 further comprising a secondary processing unit communicatively coupled with the processing unit, wherein the secondary processing unit is configured for performing at least one administrative task associated with at least one of the processing unit and the at least one sensor, wherein the generating of the at least one sensor data and the analyzing of the at least one sensor data is based on the performing of the at least one administrative task.

5. The encryption retransmission IIoT device of claim 4, wherein the secondary processing unit comprises a System on Chip (SoC).

6. The encryption retransmission IIoT device of claim 1 further comprising at least one actuator communicatively coupled with the processing unit, wherein the processing unit is further configured for generating at least one operation data, wherein the at least one actuator is configured for performing at least one operation associated with the encryption retransmission IIoT device based on the at least one operation data.

7. The encryption retransmission IIoT device of claim 6, wherein the first communication unit is further configured for:

receiving an ingressing packet comprising an encrypted ingressing native packet and a complex header from the first external encryption retransmission device;

removing the complex header from the ingressing packet; and adding a connectionless header to the ingressing packet for forming an ingressing connectionless datagram, wherein the ingressing connectionless datagram comprises the encrypted ingressing native packet, wherein the at least one first encryption unit is further configured for:

receiving the ingressing connectionless datagram comprising the ingressing encrypted native packet; and decrypting the encrypted ingressing native packet using the at least one encryption key to obtain an ingressing native packet, wherein the ingressing native packet comprises at least one first information, wherein the network switch is further configured for transferring the at least one first information to the processing unit based on the obtaining of the ingressing native packet, wherein the processing unit is configured for analyzing the at least one first information based on the transferring of the at least one first information, wherein the generating of the at least one operation data is further based on the analyzing of the at least one first information.

8. The encryption retransmission IIoT device of claim 1, wherein the at least one encryption unit of each of the plurality of encryption retransmission devices comprises two encryption units, wherein the two encryption units are communicatively coupled.

9. The encryption retransmission IIoT device of claim 1, wherein the control encryption retransmission device comprises at least one control encryption unit and a control communication unit communicatively coupled with the at least one control encryption unit, wherein the control communication unit is paired with a control external communication unit of the control external encryption retransmission device connected to the control external device, wherein the control communication unit is configured for:

receiving a control ingressing packet comprising a control encrypted ingressing native packet and a complex header from the control external encryption retransmission device;

removing the complex header from the control ingressing packet; and adding a connectionless header to the control ingressing packet for forming a control ingressing connectionless datagram, wherein the control ingressing connectionless datagram comprises the control encrypted ingressing native packet, wherein the at least one control encryption unit is configured for:

receiving the control ingressing connectionless datagram comprising the control ingressing encrypted native packet; and decrypting the control encrypted ingressing native packet using the at least one encryption key to obtain a control ingressing native packet, wherein the control ingressing native packet comprises the at least one information.

10. The encryption retransmission IIoT device of claim 9, wherein the at least one control encryption unit comprises an encryption unit and a field-programmable gate array (FPGA) communicatively coupled with the encryption unit.

11. The encryption retransmission IIoT device of claim 1, wherein the at least one encryption unit of each of the plurality of encryption retransmission devices is communicatively coupled to the communication unit of each of the plurality of encryption retransmission devices via a one-way connection for providing at least one instruction to the communication unit.

12. The encryption retransmission IIoT device of claim 1 further comprising at least one anomaly detector communicatively coupled with at least one of the processing unit, the network switch, and the plurality of encryption retransmission devices, wherein the at least one anomaly detector is configured for:

analyzing at least one signal associated with at least one of the processing unit, the network switch, and the plurality of encryption retransmission devices using at least one machine learning model;

determining an attack associated with at least one of the processing unit, the network switch, and the plurality of encryption retransmission devices based on the analyzing; and generating an alert for the attack based on the determining of the attack.

13. An encryption retransmission Industrial Internet of Things (IIoT) device for providing resiliency against attacks, the encryption retransmission IIoT device comprising:

at least one sensor configured for generating at least one sensor data by detecting at least one variable associated with the encryption retransmission IIoT device;

a processing unit communicatively coupled with the at least one sensor, wherein the processing unit is configured for analyzing the at least one sensor data for generating at least one analytics data for the at least one sensor data;

a storage device communicatively coupled with the processing unit, wherein the storage device is configured for storing the at least one sensor data;

a secondary processing unit communicatively coupled with the processing unit, wherein the secondary processing unit is configured for performing at least one administrative task associated with at least one of the processing unit and the at least one sensor, wherein the generating of the at least one sensor data and the analyzing of the at least one sensor data is based on the performing of the at least one administrative task;

a network switch communicatively coupled with the processing unit, wherein the network switch comprises a plurality of ports, wherein the network switch is positioned on an encrypted side of a trust boundary of the encryption retransmission IIoT device such that the network switch is not accessible from an unencrypted side of the trust boundary without passing through at least one encryption unit of a plurality of encryption retransmission devices; and the plurality of encryption retransmission devices connected with the network switch through the plurality of ports, wherein each of the plurality of encryption retransmission devices associated with each of the plurality of ports comprises at least one encryption unit and a communication unit communicatively coupled with the at least one encryption unit, wherein the network switch is configured for:

identifying a first external device from a plurality of external devices based on at least one information, wherein the plurality of external devices is connected with a plurality of communication units of the plurality of encryption retransmission devices via a plurality of external encryption retransmission devices;

identifying a first encryption retransmission device from the plurality of encryption retransmission devices based on the identifying of the first external device; and transferring the at least one analytics data to the first encryption retransmission device based on the identifying of the first encryption retransmission device, wherein the first encryption retransmission device comprises:

at least one first encryption unit configured for:

encrypting an egressing native packet comprising the at least one analytics data using at least one encryption key to create an encrypted egressing native packet based on the transferring of the at least one analytics data; and adding a connectionless header to the encrypted egressing native packet to form an egressing connectionless datagram; and a first communication unit communicatively coupled with the at least one first encryption unit, wherein the first communication unit is paired with a first external communication unit of the first external encryption retransmission device connected to the first external device, wherein the first communication unit is configured for:

receiving the egressing connectionless datagram; and adding a complex header to the egressing connectionless datagram for forming an egressing packet for delivery to the first external encryption retransmission device;

wherein the plurality of encryption retransmission devices comprises a control encryption retransmission device connected with the network switch through a control port of the plurality of ports, wherein the control encryption retransmission device is connected to a control external device via a control external encryption retransmission device of the plurality of external encryption retransmission devices.

14. The encryption retransmission IIoT device of claim 13, wherein the at least one encryption unit of each of the plurality of encryption retransmission devices comprises two encryption units, wherein the two encryption units are communicatively coupled.

15. The encryption retransmission IIoT device of claim 14, wherein the control encryption retransmission device comprises at least one control encryption unit and a control communication unit communicatively coupled with the at least one control encryption unit, wherein the control communication unit is paired with a control external communication unit of the control external encryption retransmission device connected to the control external device, wherein the control communication unit is configured for:

receiving a control ingressing packet comprising a control encrypted ingressing native packet and a complex header from the control external encryption retransmission device;

removing the complex header from the control ingressing packet; and adding a connectionless header to the control ingressing packet for forming a control ingressing connectionless datagram, wherein the control ingressing connectionless datagram comprises the control encrypted ingressing native packet, wherein the at least one control encryption unit is configured for:

receiving the control ingressing connectionless datagram comprising the control ingressing encrypted native packet; and decrypting the control encrypted ingressing native packet using the at least one encryption key to obtain a control ingressing native packet, wherein the control ingressing native packet comprises the at least one information.

16. The encryption retransmission IIoT device of claim 15, wherein the at least one control encryption unit comprises an encryption unit and a field-programmable gate array (FPGA) communicatively coupled with the encryption unit.

17. The encryption retransmission IIoT device of claim 13 further at least one anomaly detector communicatively coupled with at least one of the processing unit, the network switch, and the plurality of encryption retransmission devices, wherein the at least one anomaly detector is configured for:

analyzing at least one signal associated with at least one of the processing unit, the network switch, and the plurality of encryption retransmission devices using at least one machine learning model;

determining an attack associated with at least one of the processing unit, the network switch, and the plurality of encryption retransmission devices based on the analyzing; and generating an alert for the attack based on the determining of the attack.

18. An encryption retransmission Industrial Internet of Things (IIoT) device for providing resiliency against attacks, the encryption retransmission IIoT device comprising:

at least one sensor configured for generating at least one sensor data by detecting at least one variable associated with the encryption retransmission IIoT device;

at least one actuator configured for performing at least one operation associated with the encryption retransmission IIoT device based on at least one operation data;

a processing unit communicatively coupled with the at least one sensor and the at least one actuator, wherein the processing unit is configured for:

analyzing the at least one sensor data for generating at least one analytics data for the at least one sensor data; and generating the at least one operation data;

a storage device communicatively coupled with the processing unit, wherein the storage device is configured for storing the at least one sensor data;

a secondary processing unit communicatively coupled with the processing unit, wherein the secondary processing unit is configured for performing at least one administrative task associated with at least one of the processing unit and the at least one sensor, wherein the generating of the at least one sensor data and the analyzing of the at least one sensor data is based on the performing of the at least one administrative task;

a network switch communicatively coupled with the processing unit, wherein the network switch comprises a plurality of ports, wherein the network switch is positioned on an encrypted side of a trust boundary of the encryption retransmission IIoT device such that the network switch is not accessible from an unencrypted side of the trust boundary without passing through at least one encryption unit of a plurality of encryption retransmission devices; and the plurality of encryption retransmission devices connected with the network switch through the plurality of ports, wherein each of the plurality of encryption retransmission devices associated with each of the plurality of ports comprises at least one encryption unit and a communication unit communicatively coupled with the at least one encryption unit, wherein the network switch is configured for:

identifying a first external device from a plurality of external devices based on at least one information, wherein the plurality of external devices is connected with a plurality of communication units of the plurality of encryption retransmission devices via a plurality of external encryption retransmission devices;

identifying a first encryption retransmission device from the plurality of encryption retransmission devices based on the identifying of the first external device; and transferring the at least one analytics data to the first encryption retransmission device based on the identifying of the first encryption retransmission device, wherein the first encryption retransmission device comprises:

at least one first encryption unit configured for:

encrypting an egressing native packet comprising the at least one analytics data using at least one encryption key to create an encrypted egressing native packet based on the transferring of the at least one analytics data; and adding a connectionless header to the encrypted egressing native packet to form an egressing connectionless datagram; and a first communication unit communicatively coupled with the at least one first encryption unit, wherein the first communication unit is paired with a first external communication unit of the first external encryption retransmission device connected to the first external device, wherein the first communication unit is configured for:

receiving the egressing connectionless datagram;

adding a complex header to the egressing connectionless datagram for forming an egressing packet for delivery to the first external encryption retransmission device;

receiving an ingressing packet comprising an encrypted ingressing native packet and a complex header from the first external encryption retransmission device;

removing the complex header from the ingressing packet; and adding a connectionless header to the ingressing packet for forming an ingressing connectionless datagram, wherein the ingressing connectionless datagram comprises the encrypted ingressing native packet, wherein the at least one first encryption unit is further configured for:

receiving the ingressing connectionless datagram comprising the ingressing encrypted native packet; and decrypting the encrypted ingressing native packet using the at least one encryption key to obtain an ingressing native packet, wherein the ingressing native packet comprises at least one first information, wherein the network switch is further configured for transferring the at least one first information to the processing unit based on the obtaining of the ingressing native packet, wherein the processing unit is configured for analyzing the at least one first information based on the transferring of the at least one first information, wherein the generating of the at least one operation data is further based on the analyzing of the at one first information;

wherein the plurality of encryption retransmission devices comprises a control encryption retransmission device connected with the network switch through a control port of the plurality of ports, wherein the control encryption retransmission device is connected to a control external device via a control external encryption retransmission device of the plurality of external encryption retransmission devices.

* * * * *